United States Patent [19]

Itoh et al.

[11] Patent Number: 4,771,656
[45] Date of Patent: Sep. 20, 1988

[54] CRUISE CONTROL METHOD AND APPARATUS FOR A VEHICLE WITH A CONTINUOUSLY VARIABLE TRANSMISSION

[75] Inventors: Hiroshi Itoh, Toyota; Shigeki Hiramatsu, Okazaki; Mitsuru Takada, Toyota, all of Japan

[73] Assignee: Toyota Jidoshi Kabushiki Kaisha, Toyota, Japan

[21] Appl. No.: 911,874

[22] Filed: Sep. 26, 1986

Related U.S. Application Data

[63] Continuation-in-part of Ser. No. 556,126, Nov. 29, 1983, abandoned.

[30] Foreign Application Priority Data

Nov. 29, 1982 [JP] Japan ................. 57-207736
Dec. 1, 1982 [JP] Japan ................. 57-209324

[51] Int. Cl.$^4$ .............................. B60K 41/18
[52] U.S. Cl. .............................. 74/866; 74/859
[58] Field of Search ............. 74/857, 859, 866, 863, 74/862, 867, 865; 180/177, 179; 364/424.1

[56] References Cited

U.S. PATENT DOCUMENTS

| | | | |
|---|---|---|---|
| 4,220,059 | 9/1980 | Mizuno et al. | 74/865 |
| 4,281,567 | 8/1981 | Maurer | 74/866 |
| 4,291,594 | 9/1981 | Baudoin | 74/857 |
| 4,383,456 | 5/1983 | Ganoung | 74/866 |
| 4,397,379 | 8/1983 | Baudoin | 192/0.032 |
| 4,445,329 | 5/1984 | Drisko | 60/431 |
| 4,458,318 | 7/1984 | Smit et al. | 364/424.1 |
| 4,458,560 | 7/1984 | Frank et al. | 74/857 |
| 4,458,561 | 7/1984 | Frank | 74/865 |
| 4,459,878 | 7/1984 | Frank | 74/857 |
| 4,463,629 | 8/1984 | Himmelstein | 74/862 |
| 4,481,844 | 11/1984 | Ironside et al. | 74/866 |
| 4,507,986 | 4/1985 | Okamura et al. | 74/859 |
| 4,535,865 | 8/1985 | Tanieawa et al. | 180/177 |

FOREIGN PATENT DOCUMENTS

57-67362  4/1982  Japan .

Primary Examiner—Leslie A. Braun
Assistant Examiner—David Novais
Attorney, Agent, or Firm—Oblon, Fisher, Spivak, McClelland & Maier

[57] ABSTRACT

A method wherein control of a desired engine speed occurs during a period when a throttle valve is opened at an upper limit position by an auto drive. Vo is defined as a desired vehicle speed, Vr as an actual vehicle speed, A1 as a positive constant and A2 as another positive constant smaller than A1. When Vo-Vr≧A1, the desired engine speed is increased. When Vo-Vr<A2, the desired engine speed is decreased or maintained.

12 Claims, 6 Drawing Sheets

CRUISE CONTROL METHOD AND APPARATUS FOR A VEHICLE WITH A CONTINUOUSLY VARIABLE TRANSMISSION

BACKGROUND OF THE INVENTION

This is a Continuation-in-Part of U.S. application Ser. No. 556,126 filed Nov. 29, 1983 now abandoned.

FIELD OF THE INVENTION

This invention relates to a cruise control method for vehicles with a continuously variable transmission (hereinafter called CVT) and more particularly to a cruise control method and apparatus during a period when the opening of a throttle valve of an intake system reaches the upper limit of a control range of a cruise control mechanism or when the opening of the throttle valve is of that in idling.

DESCRIPTION OF THE PRIOR ART

This applicant previously disclosed CVT mounted on a vehicle in Japanese patent application No. 67362/1982, and in the vehicle with such a CVT a desired engine speed No is defined as a function of the opening of a throttle valve of an intake system, i.e. throttle position R.

Also, while the cruise control mechanism reduces the throttle position R when an actual vehicle speed Vr is larger than a desired vehicle speed Vo and increases the throttle position R when the actual vehicle speed Vr is smaller than the desired vehicle speed Vo, it utilizes negative pressure in the intake pipe as a force for pulling a throttle cable coupled with the throttle valve. Thus, in climbing a slope the negative pressure in the intake pipe is reduced and the upper limit of control range of the throttle position of the cruise control mechanism does not reach 100% so that a hindrance to a necessary engine output is constituted in vehicles with a CVT in said prior application. Further in descending a slope, the engine speed is maintained at a certain desired value corresponding to the throttle position 0% so that the speed ratio (=output side rotational speed Nout/input side rotational speed Nin) of a CVT is increased or reach the upper limit and only the vehicle speed Vr is increased or maintained at a large value to constitute a hindrance to the proper operation of an engine brake.

An example of a cruise control system for an automotive vehicle is set forth in U.S. Pat. No. 4,535,865.

SUMMARY OF THE INVENTION

An object of the present invention is to provide a cruise control method and apparatus for vehicles with a CVT which can increase engine power in a period when a throttle position reaches the upper limit (provided this upper limit is less than 100%) of a range of the cruise control in climbing a slope for example.

A further object of the present invention is to provide a cruise control method and apparatus for vehicles with a CVT which can properly operate an engine brake to carry out proper automatic control of vehicle speed in a travelling period when a throttle position is maintained at an idling position by the cruise control in descending a slope, for example.

According to the present invention to achieve these objects, in a period when the opening of an intake system throttle valve reaches the upper limit of a control range of the cruise control the actual vehicle speed Vr is compared with the desired vehicle speed Vo, whereby when $Vo-Vr \geq A1$ (provided A1 is a predetermined positive value) the desired engine speed No is increased or the desired speed ratio eo of the CVT is decreased, and when $Vo-Vr < A2$ (provided A2 is a predetermined positive value and $A2 < A1$) the desired engine rpm is maintained as it is, or decreased, or the desired speed ratio eo of the CVT is maintained as it is, or increased.

Thus, according to the present invention in the period when the throttle position R reaches the upper limit of control range of the cruise control, the desired rotational speed No is increased or the speed ratio e of the CVT is decreased when $Vo-Vr \geq A1$ and as a result the actual engine rpm Nr is increased so that the engine power is increased. In this case when $Vo-Vr \leq A2$ the desired engine rpm is maintained as it is, or decreased or the desired speed ratio eo of the CVT is maintained as it is, or increased so that the engine power is increased to be set to a required output.

Further, according to the present invention, in a travelling period when the opening of the intake system throttle valve is maintained at the idling opening by the cruise control, the actual vehicle speed Vr is compared with the desired vehicle speed Vo. When $Vr-Vo \geq A1$, (provided A1 is a predetermined positive value) the desired engine speed No is increased or the desired speed ratio eo of the CVT is decreased and when $Vr-Vo < A2$ (provided A2 is a predetermined positive value smaller than A1) the desired engine speed No is maintained as it is, or decreased, or the desired speed ratio eo of CVT is maintained as it is, or increased.

Thus, according to the present invention, in a travelling period when the throttle position R is maintained at the idling position by the cruise control, the desired engine speed No is increased for the desired speed ratio eo is decreased when $Vr-Vo > A1$, so that a proper engine brake is operated and the vehicle speed Vr can be maintained at the desired vehicle speed Vo.

Since in a preferred embodiment the desired engine speed No or the desired speed ratio eo is stepwise increased or decreased the occurrence of hunting can be avoided.

Further the speed ratio e is defined as follows;

$$e = Nout/Nin$$

provided
Nout is the rotational speed of the output shaft of the CVT and
Nin is the rotational speed of the input shaft of the CVT.

Also, the desired speed ratio eo is Nout/No, for example.

BRIEF DESCRIPTION OF THE DRAWINGS

Other objects and advantages of the present invention will become apparent from the following description taken in conjunction with the accompanying drawings, in which.

DETAILED DESCRIPTION OF THE PREFERRED EMBODIMENT

Figure 1:
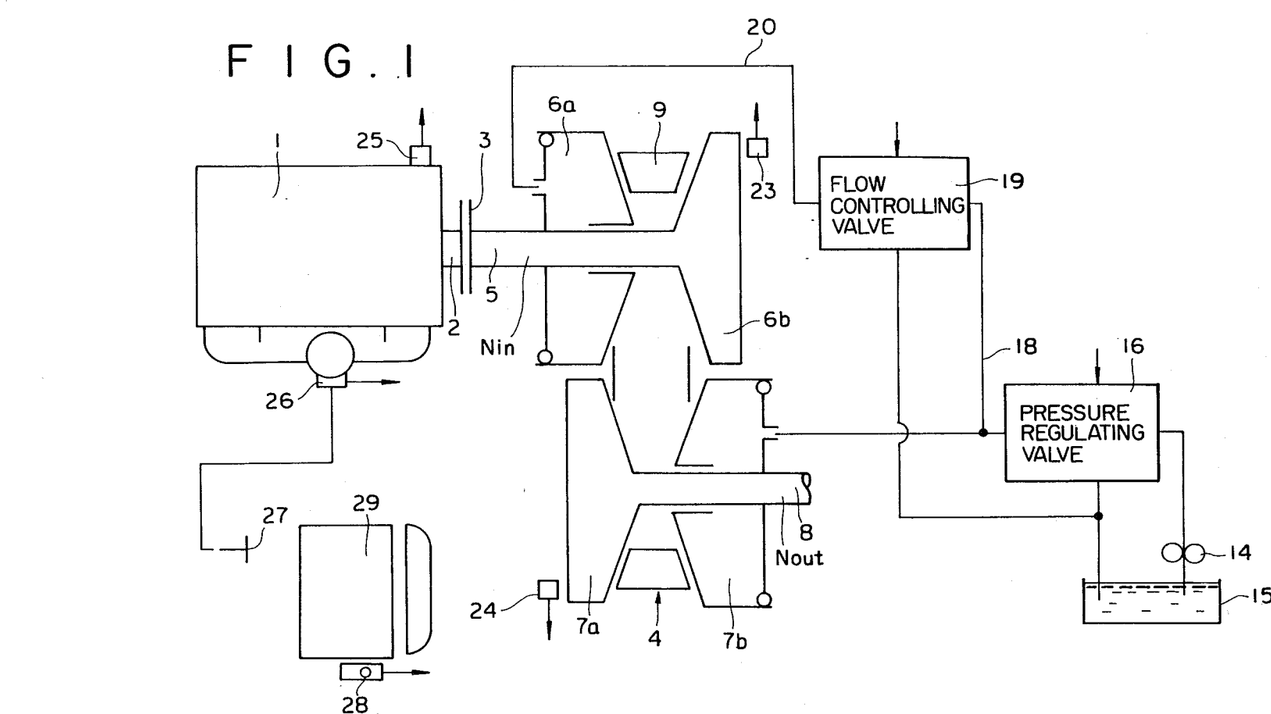
FIG. 1 is an explanatory view showing the overall construction a system exemplifying a CVT.

In FIG. 1, a crankshaft 2 of an engine 1 of a vehicle is connected to an input shaft 5 of CVT 4 through a clutch 3. A pair of input side disks 6a, 6b are provided so as to be opposed to each other, one input side disk 6a being provided relatively axially and movably on the input shaft 5 the other input side disk 6b being secured fixedly to the input shaft 5. Also, a pair of output side disks 7a, 7b are provided so as to be opposed to each other, one output side disk 7a being secured fixedly to an output shaft 8 and the other output side disk 7b being provided axially movably on the output shaft 8. A belt 9 having an isosceles trapezoidal cross-section is trained over the input and output side disks 6a, 6b and 7a, 7b. Opposed surfaces of the input and output side disks 6a, 6b and 7a, 7b form a taper section such that the distance between both tapered surfaces increases as they extend radially outward. The radii engaging the belt 9 on the input and output side disks 6a, 6b and 7a, 7b increase or decrease in relation to a decrease or increase of the distance between the opposed surfaces of the disks 6a, 6b, 7a, 7b to vary the speed ratio of the CVT and a torque transmitted therethrough (CVT transmission torque). An oil pump 14 forwards oil drawn from an oil reservoir 15 to a pressure regulating valve 16 of a linear solenoid system which controls the amount of oil drained to a drain 17 for controlling a line pressure in an oil path 18. The oil path 18 is connected to a hydraulic servo of the output side disk 7b. A flow controlling valve 19 of the linear solenoid system increases the sectional area of flow between an oil path 20 to the hydraulic servo of the input side disk 6a and the oil path 18 while shutting off the connection between the oil path 20 and the drain 17 when a pressing force between the input side disks 6a, 6b is increased to increase the speed ratio, and shuts off the connection between the oil paths 18 and 20 and decrease the sectional area of flow between the oil path 20 and the drain 17 when the pressing force between the input side disks 6a, 6b is decreased to decrease the speed ratio.

Figure 2:
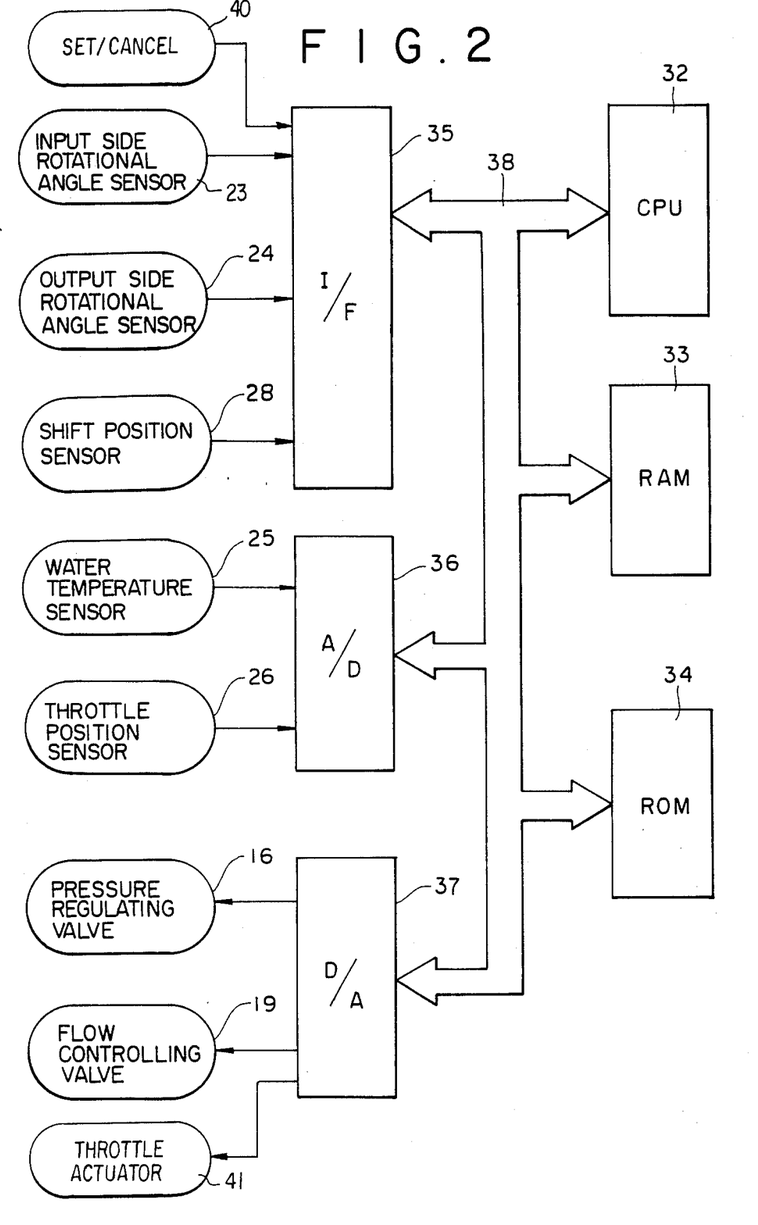
FIG. 2 shows, in a block diagram format, an electronic control unit used with the CVT system of FIG. 1.

A SET/CANCEL switch 40 shown in FIG. 2 is provided to establish a cruise control mode which will be described. To establish the cruise control mode, switch 40 is set by hand at its SET position. The cruise control mode or the SET condition is automatically cancelled when the brake pedal or accelerator pedal is depressed.

Rotational angle sensors 23, 24 detect, respectively, the rotational speeds of the input side disk 6b and the output side disk 7a. The servo oil pressure of the output side disk 7b, i.e. line pressure in the path 18 is controlled to the minimum pressure to ensure torque transmission without any slipping of the belt 9 to restrain the drive loss of the pump 14. By flow of oil to the input side disk 6a, the speed ratio of CVT 4 is controlled. Further, while the servo oil pressure of the output side disk 7b is larger than or equal to the servo oil pressure of the input side disk 6a, the input side pressure receiving area of a servo piston is larger than that of the output side so that a speed ratio larger than 1 can be realized. A water temperature sensor 25 detects a cooling water temperature of the engine 1. A throttle position sensor 26 detects the opening of an intake system throttle valve connected with an accelerator pedal 27. Throttle valve sensor 26 is also connected to a throttle actuator 41. In the cruise control mode, the throttle position or opening $\theta$ is automatically controlled by the throttle actuator 41. The throttle actuator 41 is of a well known diaphragm type, and is operated with a negative or vacuum pressure in the intake pipe of the engine 1. The vacuum pressure is supplied to the throttle actuator 41 through a tube 42. A shift position sensor 28 detects the range of a shift lever near a cab 29.

FIG. 2 is a block diagram of an electronic control unit. A CPU 32, RAM 33, ROM 34, I/F (interface) 35, A/D (analog/digital converter) 36 and D/A (digital-/analog converter) 37 are connected to each other by a bus 38. The output pulses of rotational angle sensors 23, 24 and the shift position sensor 28 are sent to the interface 35, and the analog outputs of the water temperature sensor 25 and the throttle position sensor 26 sent to A/D 37 and the output of D/A 37 sent to the pressure regulating valve 16 and the flow controlling valve 19.

Figure 3:
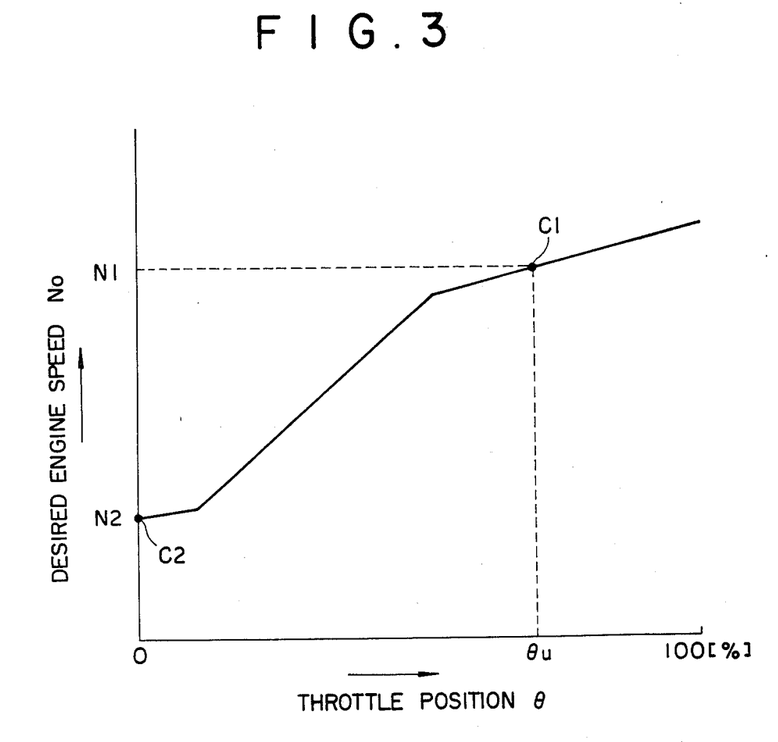
FIG. 3 is a graph representing the relationship between a throttle position and a desired engine speed.

FIG. 3 shows the relationship between the throttle position $\theta$, i.e. the opening $\theta$ of the intake system throttle valve and the desired engine speed No. The term "$\theta$" is interpreted to mean the position or opening angle of the throttle valve which is determined by an amount of depression of the accelerator pedal 27. In a vehicle with a CVT, the horse power requirement of the engine is defined as a function of the throttle position $\theta$ and the engine speed achieving each horse power requirement with the minimum specific fuel consumption is set as a desired engine speed No.

In a non-operative period of a cruise control with the SET/CANCEL switch 40 set in the CANCEL position; the desired engine speed No is calculated in relation to the throttle position $\theta$ determined as a function, of an amount of operation of the accelerator pedal 27 by a driver. Thus, oil flow sent from the flow controlling valve 19 to the hydraulic servo of the input side disk 6a is controlled so that the actual engine speed Nr becomes the desired engine speed No, by way of a change in the speed ratio e of CVT 4 is.

Further the details of control in the non-operative period is as described in said prior Japanese patent application No. 67362/1982 and others.

In the operative period of the cruise control with the switch 40 set in the SET position; the throttle position $\theta$ is controlled so that an actual vehicle speed Vr becomes a desired vehicle speed Vo. Namely, within the control range of the throttle position $\theta$, the throttle position $\theta$ is increased when Vr<Vo, and the throttle position $\theta$ is decreased when Vr>Vo.

When the vehicle is climbing a slope in the operative period of the cruise control, the intake pipe negative pressure is abnormally lowered, and the upper limit $\theta u$ of the control range of the throttle position $\theta$ may be less than 100%, for example 70% as shown by point C1 in FIG. 3. In this case when Vo-Vr≦A1 (provided A1 is a predetermined positive value), the desired engine speed No is increased or the desired speed ratio eo (for example=Nout/No) or CVT 4 is decresed. As a result, the actual engine speed Nr is increased, i.e. the engine output is increased to increase also the vehicle speed Vr. After the new desired engine speed No or desired speed ratio eo, is established as decribed above, when Vo-Vr<A2 (provided A2 is a predetermined positive value and A2<A1), No or eo is maintained at it is, or No is decreased and eo increased.

Also, when the vehicle is descending a slope in the operative period of the cruise control, the throttle position $\theta$ is made 0% by the opeation of the cruise control since the actual vehicle speed Vr is increased. According to the conventional cruise control method as de-scirbed in the Description of the Prior Art, the desired engine speed No corresponding to a point C2 on the characteristic line in FIG. 3 is N2, so that the speed ratio e of CVT 4 is increased as the actual engine speed Nr is maintained at N2 in until the speed ratio e reaches the upper limit of a control range (the desired speed ratio eo increases the upper limit as the actual engine speed Nr increases), the only vehicle speed Vr is increased so that a proper engine brake is not obtained. According to the present invention, the actual vehicle Vr is compared with the desired vehicle speed Vo, and when Vr-Vo>A1 (provided A1 is a predetermined positive value), the desired engine speed is changed from value N2 at point C2 on the characteristic line in FIG. 3 to a value larger than N2 or the desired speed ratio eo of CVT 4 is changed from value e2 corresponding to point C2 to a value smaller than the e2. Consequently, the absorption torque of the engine is increased and the vehicle speed Vr is decreased. Namely, an engine brake is properly applied to the vehicle. After the new desired engine speed No or speed ratio eo is established, when Vo-Vr≧A2, (provided A2 is a predetermined value in the range of 0<A2<A1), the desired engine speed or speed ratio No or eo is maintained as it is, or the desired engine speed No is decreased and the desired speed ratio eo is increased.

Figure 4:
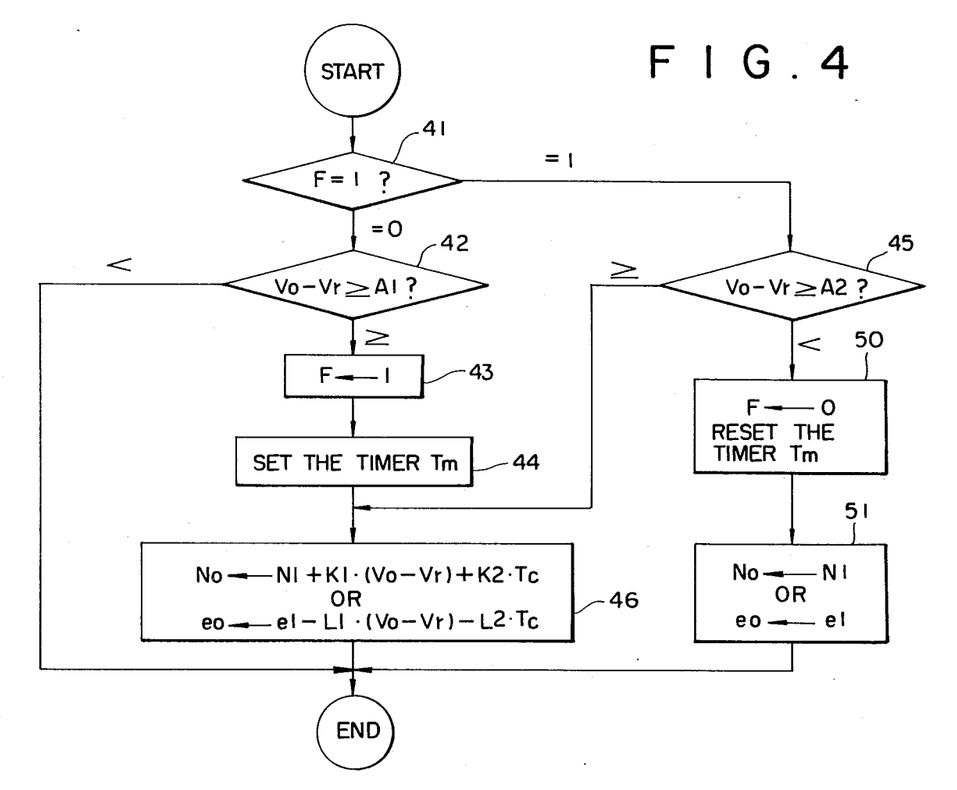
FIGS. 4 and 5 are flow charts showing two examples of control in accordance with the present invention and FIG. 6 is a block diagram illustrating certain features of the preferred embodiment of an apparatus of the present invention.

FIG. 4 is a flow chart of a program executed when the throttle position reaches the upper limit $\theta$u of cruise control range of the throttle position in the operative period or the cruise control. In step 41 is judged whether or not flag F=1 and if F=1, and an advance is made to step 45. If F=0, an advance is made to step 42. F=0 means that the desired engine speed No or the desired speed ratio eo is equal to or larger than N1 or e1 corresponding to point C1 on the characteristic line in FIG. 3, and Flag F=1 means that the desired engine speed No is not equal to N1, or the desired speed ratio is not equal to e1. In step 42 is judged whether or not Vo-Vr≧A1. If Vo-Vr≧A1, an advance is made to step 43 and if Vo-Vr <A1, the execution of steps 43, 44 and 46 is omitted. In step 43 is set flag F. In step 44 is started the operation of a timer Tm. In step 45 is judged whether of not Vo-Vr≧A2. If Vo-Vr≧A2, advance is made to step 46, and if Vo-Vr<A2, advance is made to step 50. In step 46 is substituted N1+K1 (Vo-Vr)+K2.Tc for No or eo is made to be e1-Lk(Vo-Vr)L2.Tc, provided K1, K2, L1 and L2 are positive constants, Tc is a value of the timer Tm and proportional to the passage of time after Flag F is set. Thus, the more Vo-Vr is and the longer the period when Vo-Vr≧A2 is, the more No is increased, and the larger Vo-Vr is and the longer the period when Vo-Vr≧A2 is, the more eo is decreased. In step 50 flag F is reset and timer Tm is reset. In step 51, N1 is substituted for No or e1 is substituted for eo, and thus No is decreased, or eo is increased so that the actual vehicle speed Vr is increased. As a result, when Vo-Vr<A2, No and eo are again returned to values corresponding to point C1 in FIG. 3. Further, step 51 may be omitted and thereby after Vo-Vr<A2 is obtained, No and eo may not be returned to N1 and e1 respectively, but may be maintained, as they are, at values obtained when Vo-Vr<A2.

Figure 5:
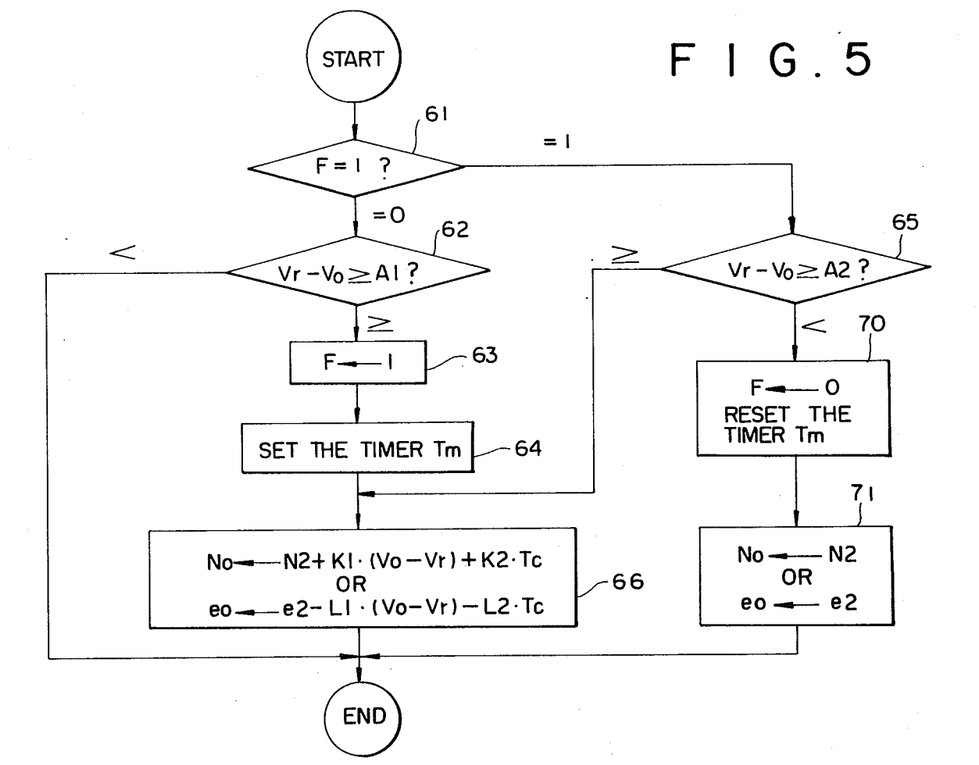

FIG. 5 is a flow chart of a program executed repeatedly in the cruise control period when the throttle position is in an idling position. In step 61 is judged whether or not Flag G=1, and if G=1, advance is made to step 65 and if G=0, advance is made to step 62. G=0 means that the desired engine, speed No or the desired speed ratio eo is equal to has the value N2 or e2 corresponding to point C2 on the characteristic line in FIG. 3, flag G−1 No is not N2 or eo is note e2. In step 62 is judged whether or not Vr-Vo≧A1. If Vr-Vo≧A1, an advance is made ,to step 63 and if Vr-Vo <A1, execution of steps 63, 64, 66 is omitted. In step 63 is set flag G while step 64 is started the operation of the timer Tm. In step 65 is judged whether or not Vr-Vo≧A2. If Vr-Vo≧A2, an advance is made to step 66 and if Vr-Vo<A2, an advance is made to step. 70. In step 66, N2+K1(Vr-Vo)+K2·Tc is substituted for No, or eo becomes e2-L1(Vr-Vo)-L2·Tc, provided K1, K2, L1 and L2 are positive constants and Tc is the value of the timer Tm proportional to the time which has elapsed after flag G is set. Thus, the larger Vr-Vo is and the longer the period when Vr-Vo≧A2 is, the more No is increased. The larger Vr-Vo is and the longerthe period when Vr-Vo≧A2 is, the more eo is decreased. In step 70 is reset the flag G and the timer, Tm. In step 71 is substituted N2 for No or e2 is substituted for eo, and thus No is decreased or eo is increased to decreasd the vehicle speed Vr. As a result, when Vr-Vo<A2, No and eo are again returned to the values corresponding to point C2 in FIG. 3. Further after the execution of step 71 is omitted and thus Vr-Vo<A2, No and eo may not be returned to N2 and e2 respectively, but may be maintained as they are at the values held when Vr-Vo<A2.

Figure 6:
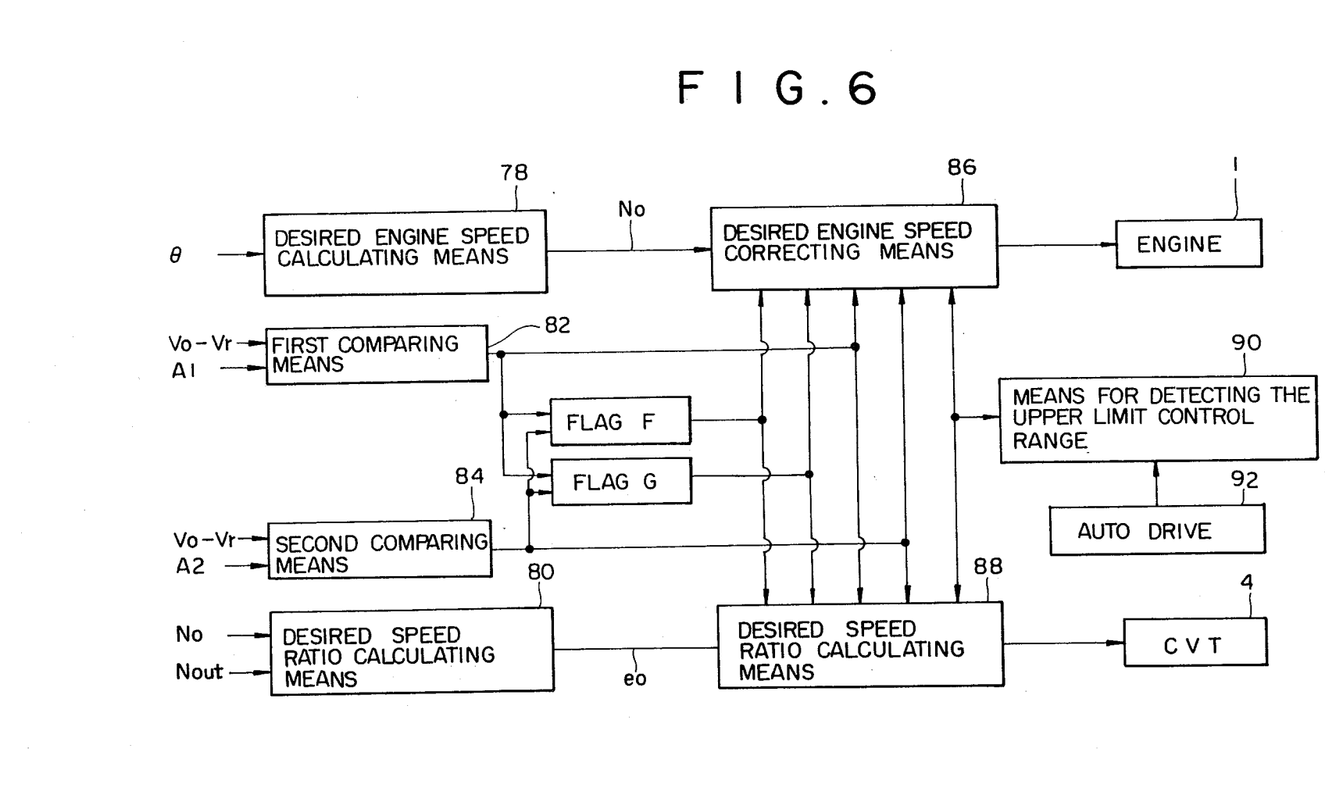

FIG. 6 is a block diagram of an apparatus according to the present invention. A desired engine speed calculating means 78 calculates the desired engine speed No on the basis of values of parameters such as throttle position $\theta$ etc. according to the graph in FIG. 3. A desired speed ratio calculating means 80 calculates the desired speed ratio. The desired speed ratio is equal to Nout/No for example, provided Nout is the rotational speed of the output shaft 8. A first comparing means 82 compares Vo-Vr with a predetermined value A1, and a second comparison means 84 compares Vo-Vr with a predetermined value A2. A desired engine speed correcting means 86 and a desired speed ratio correcting means 88 are operated only in a period when the throttle position $\theta$ is between the upper and lower limits of control range of the, cruise control (the lower limit is equal to the idling position), and when F=0 and Vo-Vr≧A1, the desired engine speed No and the desired speed ratio eo are corrected according to the formula in step 46. When G=0 and Vo-Vr≧A1, the desired engine speed No and the desired speed ratio eo are corrected on the basis of the formula in step 66 and when F=1 or G=1 and Vo-Vr is less than A2, the correction of the desired engine speed No and the desired speed ratio eo are cancelled. Further the flags F, G are set when Vo-Vr≧A2, and reset when Vo-Vr<A2. Also, a means 90 for detecting the upper and lower limits of control range detects whether or not the throttle position $\theta$ controlled by the auto drive 92 is on the upper or lower limit of the control range and the rotational speed of the engine 1 and the speed ratio e of CVT 4 are controlled in relation to the desired engine speed No and the desired speed ratio eo.

In connection with the foregoing, it is to be noted that the meaning of the phrase "control range" is such that, while the vehicle is placed in the cruise control mode (with the SET/CANCEL switch held in the SET position), the throttle valve is controlled by the throttle actuator 41 (without the operator's manipulation of the accelerator pedal, in order to maintain a preset speed of the vehicle, e.g., 60 miles/hour). The throttle actuator 41 is operated when the vacuum or negative pressure is generated in the intake pipe (intake manifold) of the engine 1.

When the vehicle, in the cruise control mode, travels along an uphill road, the negative intake pressure is lower due to a decrease in the engine speed while the engine is climbing the upward slope. In this condition, the throttle actuator 41 cannot be operated as commanded according to desired vehicle speed Vo. Consequently, the throttle valve cannot be operated over its nominal range, i.e. 0–100% range of opening. When the vehicle starts to travel on the uphill roll, the actual vehicle speed Vr is lowered and consequently the throttle valve is commanded to be fully open in order to attain the desired vehicle speed Vo. That is, the throttle valve is required to be operatd at its 100% opening position. However, the maximum possible throttle opening "θu" as shown in FIG. 3 in this condition (i.e., reduced intake negative pressure in the cruise control mode) is not the nominal 100%, but less than such nominal maximum such as, for example, 70%, because the intake negative pressure as a drive source to operate the throttle actuator 41 is lowered.

In connection with the foregoing discussion, the use of the phrase "upper limit" is meant to refer to the lowered maximum throttle opening "θu" (with reduced intake negative pressure in the cruise control mode). The phrase "control range" is interpreted to mean the range of opening of the throttle valve over which the throttle valve is operated by the throttle actuator 41. Thus the phrase "control range" can be interpreted to mean the operating range of the throttle actuator 41, and consequently the operating range of the cruise control or cruise control mechanism (which includes throttle actuator 41).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a cruise control method for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode, by a throttle actuator which is operated by a negative pressure in an intake pipe of the engine, wherein the improvement comprises the steps of:

determining whether the opening of said throttle valve reaches an upper limit of a control range of said throttle actuator in said cruise control mode;

comparing said actual vehicle speed Vr with said desired vehicle speed Vo upon determination that said upper limit is reached;

increasing a desired speed of said engine to an elevated level higher than that corresponding to said upper limit of the opening of said throttle valve so that said actual speed of the engine is increased, if a difference Vo-Vr of said actual vehicle speed Vr from said desired vehicle speed Vo is equal to or greater than a predetermined first positive value A1; and maintaining said elevated level of the desired speed of the engine, or decreasing the desired speed of the engine from said elevated level to the level corresponding to said upper limit of the throttle valve opening, when said difference Vo-Vr becomes smaller than a predetermined second positive value A2 which is smaller than said first positive value A1.

2. In a cruise control method for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, Said engine having a throttle valve whose opening is automatically changed in said cruise control mode, by a throttle actuator which is operated by a negative pressure in an intake pipe of the engine, wherein the improvement comprises the steps of:

determining whether the opening of said throttle valve reaches an upper limit of a control range of said throttle actuator in said cruise control mode;

comparing said actual vehicle speed Vr with said desired vehicle speed Vo upon determination that said upper limit is reached;

decreasing a desired speed ratio of said transmission to a lowered level lower than that corresponding to said upper limit of the opening of said throttle valve so that said actual speed of the engine is increased, if a difference Vo-Vr of said actual vehicle speed Vr from said desired vehicle speed Vo is equal to or greater than a predetermined first positive value A1; and maintaining said lowered level of the desired speed ratio of the transmission, or increasing the desired speed ratio of the transmission from said lowered level to the level corresponding to said upper limit of the throttle valve opening, when said difference Vo-Vr becomes smaller than a predetermined second positive value A2 which is smaller than said first positive value A1.

3. In a cruise control apparatus for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode, by a throttle actuator which is operated by a negative pressure in an intake pipe of the engine, wherein the improvement comprises:

detecting means for determining whether the opening of said throttle valve reaches an upper limit of a control range of said throttle actuator in said cruise control mode;

comparing means for comparing said actual vehicle speed Vr with said desired vehicle speed Vo upon determination that said upper limit is reached;

means for increasing a desired speed of said engine to an elevated level higher than that corresponding to said upper limit of the opening of said throttle valve so that said actual speed of the engine is increased, if a difference Vo-Vr or said actual vehicle speed Vr from said desired vehicle speed Vo is equal to or greater than a predetermined first positive value A1; and means for maintaining said elevated level of the desired speed of the engine, or decreasing the desired speed of the engine from said elevated level to the level corresponding to said upper limit of the throttle valve opening, when said difference Vo-Vr becomes smaller than a predetermined second positive value A2 which is smaller than said first positive value A1.

4. In a cruise control apparatus for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode, by a throttle actuator which is operated by a negative pressure in an intake pipe of the engine, wherein the improvement comprises:

detecting means for determining whether the opening of said throttle valve reaches an upper limit of a control range of said throttle actuator in said cruise control mode;

comparing means for comparing said actual vehicle speed Vr with said desired vehicle speed Vo upon determination that said upper limit is reached;

means for decreasing a desired speed ratio of said transmission to a lowered level lower that that corresponding to said upper limit of the opening of said throttle valve so that said actual speed of the engine is increased, if a difference Vo-Vr of said actual vehicle speed Vr from said desired vehicle speed Vo is equal to or greater than a predetermined first positive value A1; and means for maintaining said lowered level of the desired speed ratio of the transmission, or increasing the desired speed ratio of the transmission from said lowered level to the level corresponding to said upper limit of the throttle valve opening, when said difference Vo-Vr becomes smaller than a predetermined second positive value A2 which is smaller than said first positive value A1.

5. In a cruise control method for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode, wherein the improvement comprises the steps of:

determining whether the opening of said throttle valve reaches a lower limit of its control range in said cruise control mode;

comparing said actual vehicle speed Vr with said desired vehicle speed Vo upon determination that said lower limit is reached;

increasing a desired speed of said engine to an elevated level higher than that corresponding to said lower limit of the opening of said throttle valve so that said actual speed of the engine is increased, if a difference Vr-Vo of said desired vehicle speed Vo from said actual vehicle speed Vr is equal to or greater than a predetermined first positive value A1; and maintaining said elevated level of the desired speed of the engine, or decreasing the desired speed of the engine from said elevated level to the level corresponding to said lower limit of the throttle valve opening, when said difference Vr-Vo becomes smaller than a predetermined second positive value A2 which is smaller than said first positiee value A1.

6. A cruise control method according to claim 5, wherein said lower limit of the throttle valve opening corresponds to an idling speed of said engine.

7. In a cruise control method for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode wherein the improvement comprises the steps of:

determining whether the opening of said throttel valve reaches a lower limit of its control range in said cruise control mode;

comparing said actual vehicle speed Vr with said desired vehicle speed Vo upon determination that said lower limit is reached;

decreasing a desired speed ratio of said transmission to a lowered level than that corresponding to said lower limit of the opening of said throttle valve so that said actual speed of the engine is increased, if a difference Vr-Vo of said desired vehicle speed Vo from said actual vehicle speed Vr is equal to or greater than a predetermined first positive value A1; and maintaining said lowered level of the desired speed ratio of the transmission, or increasing the desired speed ratio of the transmission from said lowered level to the level corresponding to said lower limit of the throttle valve opening, when said difference Vr-Vo becomes smaller than a predetermined second positive value A2 which is smaller than said first positive value A1.

8. A cruise control method according to claim 7, wherein said lower limit of the throttle valve opening corresponds to an idling speed of said engine.

9. In a cruise control apparatus for a vehicle with a continuosssly variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode, wherein the improvement comprises:

detecting means for determining whether the opening of said throttle valve reaches a lower limit of its control range in said cruise control mode;

comparing means for comparing said actual vehicle speed Vr with said desired vehicle speed Vo upon determination that said lower limit is reached;

means for increasing a desired speed of said engine to an elevated level higher than that corresponding to said lower limit of the opening of said throttle valve so that said actual speed of the engine is increased, if a difference Vr-Vo of said desired vehicle speed Vo from said actual vehicle speed Vr is equal to or greater than a predetermined first positive value A1; and means for maintaining said elevated level of the desired speed of the engine, or decreasing the desired speed of the engine from said elevated level to the level corresponding to said lower limit of the throttle valve opening, when said difference Vr-Vo becomes smaller than a predetermined second positive value A2 which is smaller than said first positive value A1.

10. A cruise control method according to claim 9, wherein said lower limit of the throttle valve opening corresponds to an idling speed of said engine.

11. In a cruise control apparatus for a vehicle with a continuously variable transmission connected to an engine, wherein an actual speed of the engine and an actual speed ratio of the transmission are automatically controlled in a cruise control mode, so that an actual vehicle speed Vr coincides with a desired vehicle speed Vo, said engine having a throttle valve whose opening is automatically changed in said cruise control mode, wherein the improvement comprises:

detecting means for determining whether the opening of said throttle valve reaches a lower limit of a control range of said throttle actuator means in said cruise control mode;

comparing means for comparing said actual vehicle speed Vr with said desired vehicle speed Vo upon determination that said lower limit is reached;

means for decreasing a desired speed ratio of said transmission to a lowered level lower than that corresponding to said lower limit of the opening of said throttle valve so that said actual speed of the engine is increased, if a difference Vr-Vo of said desired vehicle speed Vo from said actual vehicle speed Vr is equal to or greater than a predetermined first positive value A1; and means for maintaining said elevated level of the desired speed ratio of the transmission, or increasing the desired speed ratio of the transmission from said lowered level to the level corresponding to said lower limit of the throttle valve opening, when said difference Vr-Vo becomes smaller than a predetermined second positive value A2 which is smaller than said first positive value A1.

12. A cruise control method according to claim 11, wherein said lower limit of the throttle valve opening corresponds to an idling speed of said engine.

* * * * *